US006233800B1

(12) United States Patent
Larsson et al.

(10) Patent No.: US 6,233,800 B1
(45) Date of Patent: May 22, 2001

(54) VENETIAN BLIND LACING STATION

(75) Inventors: Jan-Olof Larsson, Odsmal; Peter Berntsson, Varekil, both of (SE)

(73) Assignee: Hunter Douglas International N.V., Curacao (NL)

( * ) Notice: Subject to any disclaimer, the term of this patent is extended or adjusted under 35 U.S.C. 154(b) by 0 days.

(21) Appl. No.: 09/337,023

(22) Filed: Jun. 25, 1999

(30) Foreign Application Priority Data

Jun. 26, 1998 (EP) ........................................ 98202122

(51) Int. Cl.[7] ........................................ B23P 19/04

(52) U.S. Cl. ........................................ 29/24.5

(58) Field of Search ........................ 29/24.5, 433, 559, 29/281.4, 281.5, 281.6; 140/92.1; 160/166.1; 227/19, 99; 269/317

(56) References Cited

U.S. PATENT DOCUMENTS

| | | | | |
|---|---|---|---|---|
| 4,073,044 | * | 2/1978 | Edixhoven | 19/24.5 |
| 4,514,886 | | 5/1985 | Edixhoven . | |
| 4,516,300 | * | 5/1985 | Gaillard et al. | 29/24.5 |
| 4,525,907 | | 7/1985 | Tachikawa . | |
| 4,632,156 | * | 12/1986 | Whellams | 140/92.1 |
| 5,349,730 | | 9/1994 | Anderson . | |
| 5,567,208 | * | 10/1996 | Larson et al. | 29/24.5 |

FOREIGN PATENT DOCUMENTS

| | | |
|---|---|---|
| 2535453 | 2/1977 | (DE) . |
| 29701748 | 5/1997 | (DE) . |
| 0297183 | 1/1989 | (EP) . |
| 319190 | 6/1989 | (EP) . |
| 0674092 | 9/1995 | (EP) . |
| 1291913 | 9/1962 | (FR) . |
| 2562600 | 10/1985 | (FR) . |
| 760256 | 10/1956 | (GB) . |
| 9060454 | 3/1997 | (JP) . |
| WO94/15056 | 7/1994 | (WO) . |

* cited by examiner

*Primary Examiner*—S. Thomas Hughes
*Assistant Examiner*—John C. Hong
(74) *Attorney, Agent, or Firm*—Dorsey & Whitney LLP

(57) ABSTRACT

The present invention relates to a lacing station (210) for a Venetian blind assembly machine. More particularly, the lacing station comprising a slat guiding unit (240) and a ladder cord guiding unit (214) for guiding a ladder cord in exact position for receiving a slat, where at least one needle (211) is vertically arranged above the ladder cord guiding unit (214), a lower end of the needle (211) being moveably arranged to be in close contact with the ladder cord for engagement with side cords of the ladder and having a tip (213) in close proximity to the upper end (231) of the ladder cord guiding unit (214) for twisting the ladder cord.

37 Claims, 4 Drawing Sheets

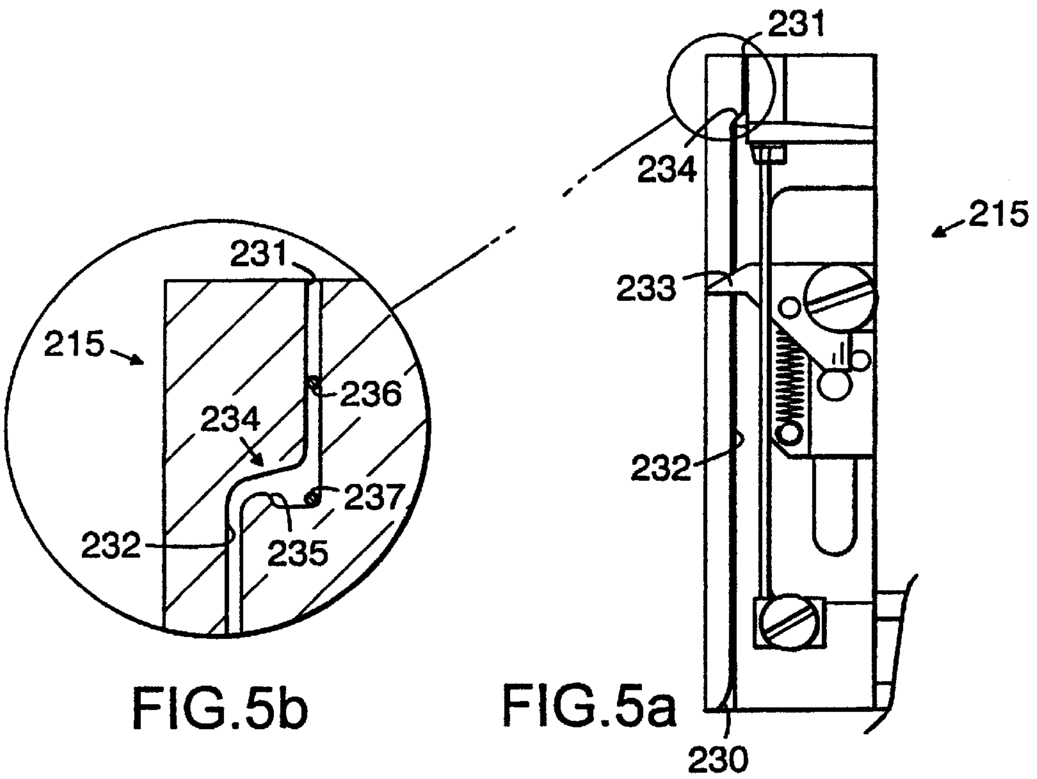
FIG.5b
FIG.5a
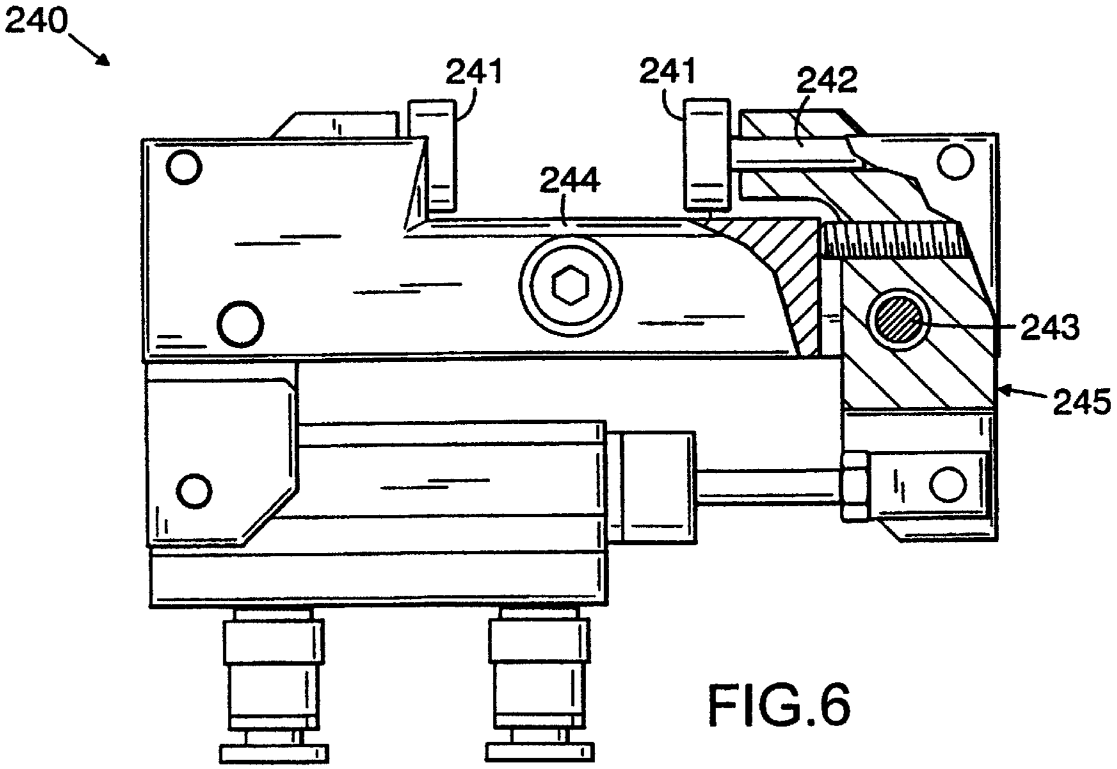
FIG.6

VENETIAN BLIND LACING STATION

CROSS-REFERENCES TO RELATED APPLICATION

This application corresponds to and claims priority to European Application No. 98202122.2, filed Jun. 26, 1998. This European application is hereby incorporated by reference as though fully set forth herein.

BACKGROUND OF THE INVENTION

1. Field of the Invention

This invention relates to a lacing station for an assembly machine for Venetian blinds.

2. Background Art

Assembly machines are known for the production of conventional Venetian blinds of different sizes and types. In these assembly machines, slats are punched and cut, and then, they are fed to a lacing station, in which the slats have been fed into the gaps between the vertical cords of a Venetian blind ladder cord. In producing Venetian blinds with these machines, the punching of the slats includes providing the slats with internal openings on the internal surface of a slat, at the position of the slat between the vertical cords of the ladder cord. The internally situated openings on each of the slats are at least provided at the two opposite ends, in the same position as the two outermost situated ladder cords, of each slat. The openings of the slats (at the same side) result in a vertically elongated channel, serving as a "route" for lift cords running internally in the slats of the Venetian blind.

In recent years, Venetian blinds, known as "routeless blinds", without internal openings on the slats and without the ordinary internally running lift cords, have been invented. DE-U-29701748.9 describes such a Venetian blind without internal openings on the slats, and consequently without the ordinary lift cords. One major problem with the usual Venetian blind, having internal openings on the slats, is that the light from the outside is not entirely shut out when the slats of the Venetian blind are placed in the slanted, "blackout" position. In spite of the slanted position of the slats, light is allowed to shine through the openings in the slats. This problem is especially annoying when there is broad daylight outside and when a total darkness is required indoors. This problem has been solved by the routeless blinds.

However, the problem of providing a suitable assembly machine for manufacturing routeless blinds has not been solved. In this regard, EP-B-0 674 092 describes a ladder guide mechanism for a Venetian blind assembly machine, having a ladder support guiding mechanism and an associated ladder support advancing mechanism, but not a mechanism for lacing the slats and ladder cords together.

BRIEF SUMMARY OF THE INVENTION

In accordance with this invention, a lacing station is provided for an assembly machine for making Venetian blinds, particularly routeless blinds. The lacing station comprises a slat guiding unit and a ladder cord guiding unit for guiding a ladder cord in exact position for receiving a slat, where at least one needle is vertically arranged above the ladder cord guiding unit, a lower end of the needle being moveably arranged to be in close contact with the ladder cord for engagement with side cords of the ladder and having a tip in close proximity to the upper end of the ladder cord guiding unit for twisting the ladder cord.

An advantage of the lacing station for a Venetian blind assembly machine of this invention is that routeless blinds can be manufactured automatically and efficiently. The ladder cord guiding unit serves as a guide and a feeding device for the ladder cord. The ladder cord contains vertical cords and has several perpendicular rungs spread along its length, the punched and cut slats are fed into the lacing station, in which the slats are fed into the gaps between the vertical cords of a Venetian blind ladder cord and above the rungs thereof. Some ladders have double rungs, and the slats may sometimes be fed between the upper and lower cords of such double rungs as disclosed in U. S. Pat. No. 4,514,886.

The lacing station of this invention advantageously comprises a pair of needles, one on each side of a passage for a slat, which is fed in position for lacing. An assembly machine may comprise several lacing stations and thus advantageously several pairs of needles evenly spread in the lacing section along the slats which are ready in position for lacing.

In operation, a ladder cord guiding unit holds a ladder cord with a rung (or two rungs forming a gap between them), in exact position to receive a slat. The slat is fed by a drive roller and through a slat guiding unit, and further in between the vertical cords of the ladder in the position of the rung (or rungs). Then, the needle is twisted around the ladder cord, before the slat is lifted and a new slat is introduced to a new rung of the ladder cord.

According to one embodiment of this invention, the side members of the ladder cord guiding unit contain slots for the ladder cord. The slot can be curved, forming a lip where behind the rungs of the ladder can rest in one feeding position, serving as a support for the ladder cord and for the exact receiving of slats in the ladder cord.

According to another embodiment of the invention, a slat guiding unit may be arranged close, immediately before and/or after, to the ladder cord guiding unit. The unit may contain slat supporting wheels, which serve as a support for the slats and keep the slats on the track when the slats are fed forward. In previously known assembly machines for producing Venetian blinds, the slats were held in place on the track by spring-loaded means, which had the disadvantage of causing wearing to the edges of the slats.

The whole production is preferably controlled and supervised by a data processing machine. Parameters such as length, width and number of twists of the needle for production of the Venetian blind are read to the computer and the assembly machine will automatically produce the desired product.

With reference to the accompanying drawings, embodiments of this invention are described, without restricting the scope of the invention thereto.

BRIEF DESCRIPTION OF THE DRAWINGS

FIG. 5*a* partial side view of one side of a ladder cord guiding unit from FIG. 3*a* according to an embodiment of the present invention.

FIG. 5*b* illustrates in an enlarged view a partial detail of the ladder cord guiding unit in FIG. 5*a*.

FIG. 6 shows in a side view, partially cross-sectional, a slat guiding unit including supporting wheels according to an embodiment of the present invention.

DESCRIPTION OF THE PREFERRED EMBODIMENT

Figure 1:
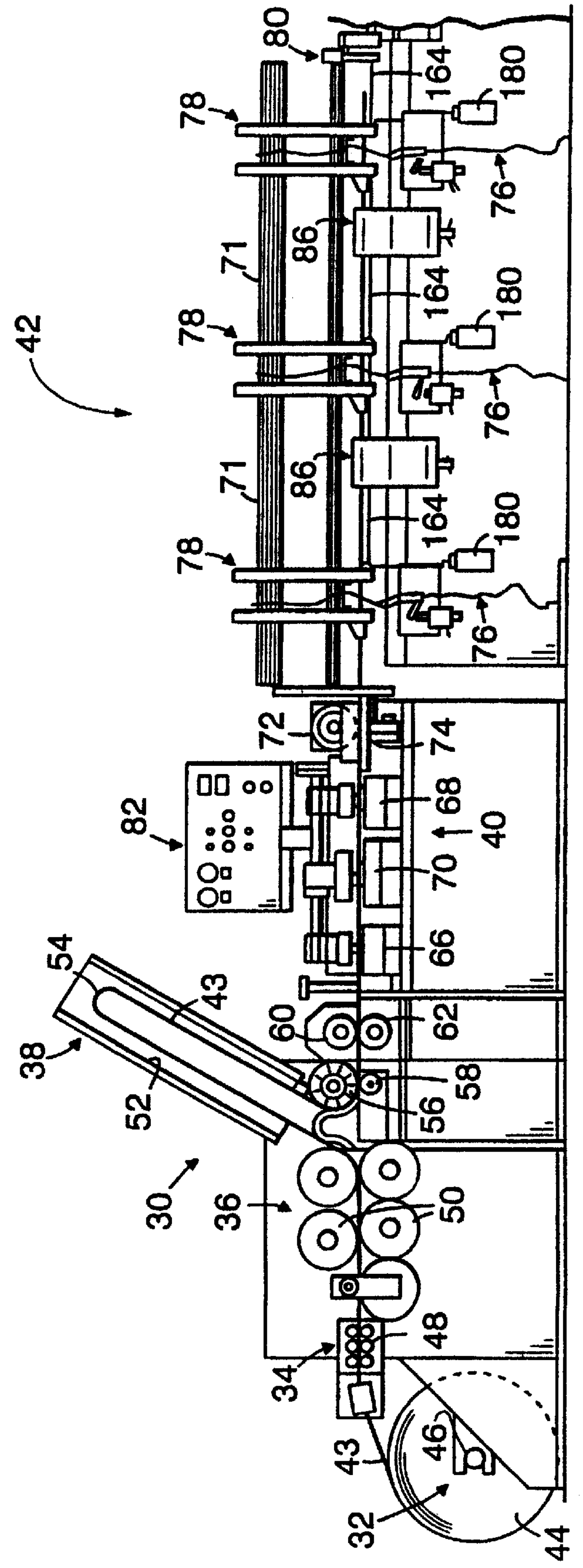
FIG.1 PRIOR ART
FIG. 1 schematic front elevation of a prior art slat assembly apparatus, showing various processing stations.

A prior art apparatus 30 for assembling Venetian blinds is illustrated in FIG. 1. The apparatus includes a supply section 32, a leveling station 34, a forming section 36, an accumulator station 38, a punch and cut section 40 and a lacing section 42.

Aluminum strip material 43 from which Venetian blinds are made is typically supplied in rolls or coils 44, which are stored at the supply section 32 on a rotatable shaft 46. The leading end of the strip of material is fed through the leveling station 34. Offset rollers 48 are positioned to receive the strip material and reversely bend the material to remove the innate bend that results from storage in a coil condition.

After the leveling station 34, the strip material passes through a forming section 36 where mating concave and convex upper and lower form rollers 50 create a transverse curvature in the strip material. An upwardly extending accumulator chamber 52 is provided at the accumulator station 38 so that a length of strip material can be stored in a loop 54. This storage is required to enable subsequent processing steps of the strip material to be intermittent.

From the accumulator station 38, the strip material passes between idler rollers 56 and 58 which may have a surface adapted to remove any irregularities from the surface of the strip material.

After passing through the accumulator station 38 and idler rollers 56 and 58 the strip is driven by drive wheels 60 and 62 one of which can be driven by an electric motor.

The drive wheels 60 and 62 cause the strip material to be fed at predetermined intervals into the punch and cut section 40, where first and second punches 66 and 68 are disposed upstream and downstream from a central cutter 70. The cutter 70 will cut the continuous strip into individual slats 71 of the required length. The punches 66 or 68 are adapted to punch holes (not shown) in the slat material strip for the accommodation of lift cords in the finished blind.

Coming from the cut and punch section 40, the strip material is fed by an outfeed drive roller 72 and outfeed backup roller 74 towards the lacing section 42. Longitudinal movement of the slat material automatically feeds it through a plurality of a downstreamly spaced ladder lacing stations 78. In these ladder lacing stations 78 the slat material is laced into flexible ladder supports or ladder cords 76, which serve to interconnect the individual slats of a blind. Downstream of the last operative lacing station 78 or combined therewith is a stop 80 against which the leading end of each slat abuts.

A computerized control system housed in a control unit 82 may be designed automatically to accept information and process such information depending on parameters such as the required dimensions for the finished blind. It will also be appreciated that different sizes of slat width (generally 25 mm or 16 mm) and different colors of blinds require different ladder supports. Depending on the number of ladder supports 76, the number of lacing stations 78 that will be operative will be variable for each blind under construction. Such information is also accommodated by the computerized control system. Each lacing station 78, with the exception of the most upstream lacing station has a sensor 86 associated therewith. For clarity the sensors, which may be photoelectric sensors, have been illustrated schematically and separate from their associated lacing station 78, but it should be understood that these may also be integrated therewith, so as to form a single combined unit.

The lacing station and sensor combinations are each adjustably positionable along the lacing section 42 and may be activated or deactivated according to requirement.

The appropriate positioning and activation of the individual lacing stations 78 advantageously will be fully automatic and controlled by the computerized control unit 82.

The system employed in the assembly apparatus to guide the movement of the slats into the lacing stations and to support the weight of the slat material between the lacing stations includes a plurality of cables 164 that are substantially horizontally disposed and which extend between adjacent lacing stations 78.

To prevent the leading end of the slat material from dropping downwardly between the successive lacing stations, the cables 164 engage the leading end of a slat and guide it to the next lacing station 78.

Due to the transverse curvature of the slat material, the cables 164 also provide lateral guidance for the moving slat material as the cables 164 engage the concave side of the slat material.

The cables 164 are anchored with one of their ends to an upstream lacing station and are each slidingly connected to an adjacent downstream lacing station.

The sliding connection allows for the distance between the lacing stations 78 to be variable and for the necessary length of cable 164 to be fed from a supply.

This supply is schematically indicated in FIG. 1 with a reference 180 and could comprise an additional supply of cable together with tensioning means for maintaining the required tension in the cable 164 for supporting the slats. Electronic encoder means could be associated with, for instance, the outfeed drive rollers 72 and 74 to register the length of slat material fed into the lacing section 42. Such encoder signals are fed to the computerized control unit 82 for calculating and generating the relevant cut and punch signals as well as the signals to lift the slats 71 in the upper portion of the lacing stations 78 upon their assembly into the ladder supports.

The remaining figures (FIGS. 2, 3*a*, 3*b*, 4*a*, 4*b*, 4*c*, 4*d*, 5*a*, 5*b*, and 6) show various aspects of a preferred embodiment of a lacing station 210 according to the present invention. The lacing station 210, which is designed to replace any of the lacing stations 78 in the arrangement of FIG. 1, comprises a slat guiding unit 240 (FIGS. 3*a* and 6) and a ladder cord guiding unit 214 (FIG. 3*a*) for guiding the ladder cords 76 into exact position for receiving a slat 71.

Figure 2:
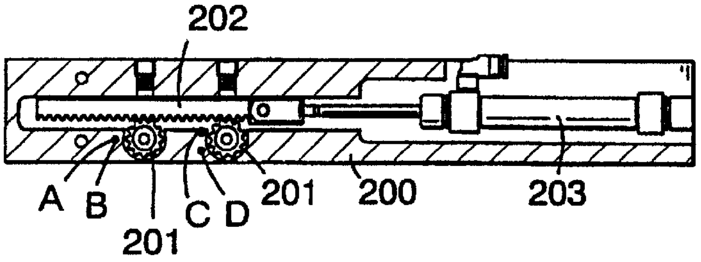
FIG. 2 is a partial cross-sectional top plan view of the overhead situated needle supporting arm according to an embodiment of the present invention.
Figure 3A:
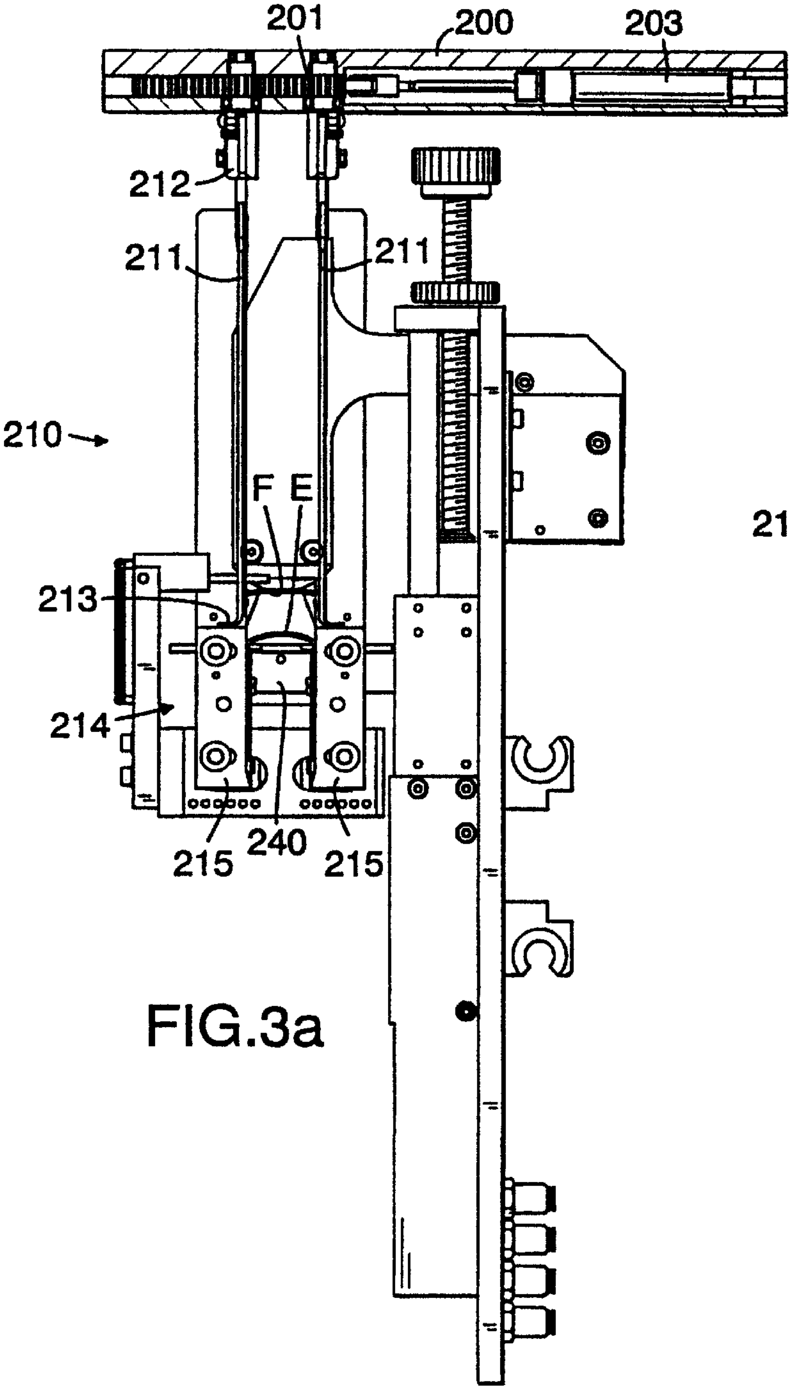
FIG. 3*a* shows in a side view the lacing station and includes in a cross-sectional side view the device of FIG. 2.
Figure 3B:
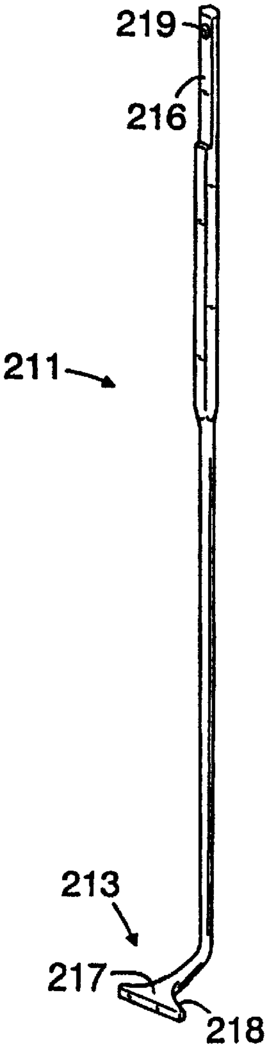
FIG. 3*b* illustrates a perspective view of one embodiment of the needle according to the present invention.

FIG. 3*b* illustrates one embodiment of a needle 211 for use in the lacing station according to the present invention. The needle has a tip 213 that is arranged perpendicular to an elongated shaft of the needle. The tip of the needle can have a T-shaped end 217, having laterally projecting portions 218 so as to serve for a close contact with the ladder cord. The needle 211 has an upper end 216 that is secured to a bracket 212 (FIG. 3*a*) of an overhead-positioned needle supporting arm 200 (FIGS. 2 and 3*a*) as discussed below. The needle 211 also has a needle's eye 219, where a lift cord (not shown) is intended to be inserted when the lacing of the slats with the ladder cord is finished.

FIGS. 2 and 3*a* show the overhead-positioned needle supporting arm 200 having a suitable driving mechanism for pivoting needles. The upper end 216 of each needle 211 is connected in the needle supporting arm 200 to a gearwheel 201, which is in engagement with a gear rack 202. Suitable driving means 203 is arranged to move the gear rack 202. Each gearwheel 201 is able to turn from a first position (A; C) to a second position (B; D), and the same path in the opposite direction.

FIG. 3*a* shows the lacing station 210 from the front in the direction of slat feed, including the device of FIG. 2. Each needle 211 is secured to the bracket 212 and fixed in the intended position. The bracket 212 is connected for rotation with the gearwheel 201. The tip 213 of each needle is arranged above the ladder cord guiding unit 214, which guides a ladder cord 76 in exact position for receiving a slat 71. The ladder cord guiding unit 214 includes two side members 215. The slat guiding unit 240 is arranged upstream from and immediately adjacent the ladder cord guiding unit 214. Also shown is a slat in position E ready for lacing and a slat which has been laced, lifted to a position F.

In operation, one of the needles 211 twists back and forth, suitably along the same path, describing a circular movement, from a first position (A) to a second position (B), which is almost a full turn from the first. As evident from FIG. 2, the other needle may turn from a first position (C), clockwise, to a second position (D). Subsequently, the needle can turn from the second position (D), counterclockwise, back to the first position (C). Consequently, each needle twists in the same path, back and forth. Hence, the needle may turn about 360°, but it is also possible that the needle only need to be twisted about 300°. The needle is suitably arranged to be moved by pivoting through an angular range from about 300° up to about 360° and preferably in the range from about 310° up to about 350°. This angular range ensures that the tip 213 of the needles 211 can be rotated out of the lift path of a laced slat 71 (e.g., out of the path of a slat being lifted from position E to position F in FIG. 3*a*). It also helps prevent the side cords 221 (FIG. 4*a*) from being prematurely released from the needle tip 213 during twisting (discussed further below) after a slat has been laced.

The overhead needle supporting arm 200 is tilted backwards when it is not in operation during mounting of needles. When operation starts, the needle supporting arm is first tilted forward and then down. After these movements, the machine is ready for production. When production is finished, the needle supporting arm 200 again is lifted and tilted backwards. This releases the needles and the needle supporting arm is out of the way. Subsequently the production goes on and a new assembly of a Venetian blind can start, and so on.

Figures 4A, 4B, 4C, 4D:
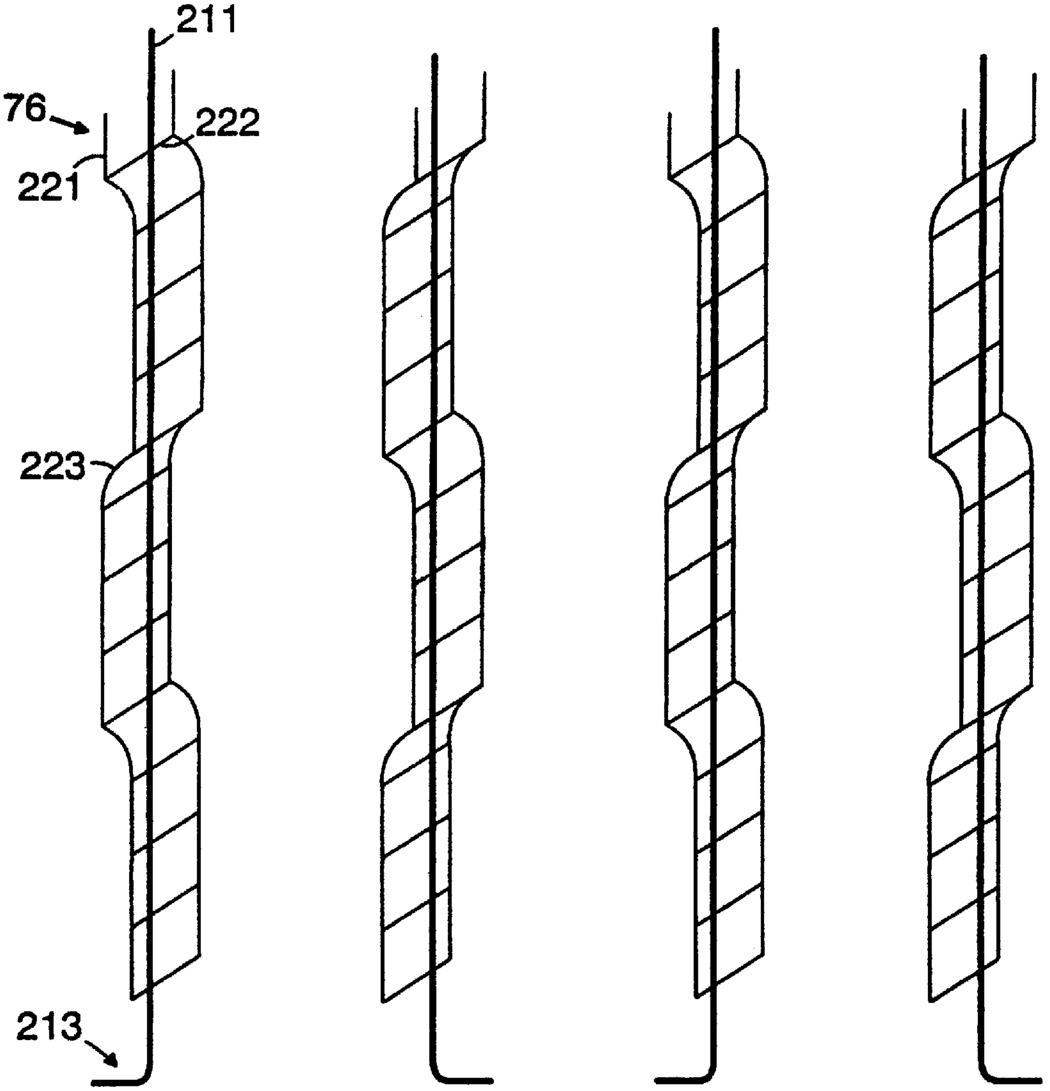
FIGS. 4*a–d* a schematic principal sketch of the operation of lacing one and several ladder cords when assemble a Venetian blind, within the assembly machine embodying the lacing station of present invention.

FIGS. 4*a–d* illustrates the principle of lacing one and several ladder cords when assembling a Venetian blind, with the assembly machine embodying the lacing station of the present invention. Hence, a Venetian blind assembly machine suitably includes a plurality of lacing stations. FIG. 4*a* illustrates a ladder cord 76 comprising two parallel vertical side cords 221 and perpendicularly arranged rungs 222 evenly applied along the ladder cord. FIGS. 4*a–d* shows four ladder cords 76 and four needles 211 positioned in accordance with the length of a Venetian blind. On the other side of the Venetian blind can likewise be positioned four needles evenly spaced (not shown). Every second needle along one side slat feed path of the Venetian blind (FIGS. 4*a* and 4*c*; or FIGS. 4*b* and 4*d*) is adapted to simultaneously move in the same direction. Every other needle along the same side of the Venetian blind twists in the opposite direction. The twist frequency is determined by a machine parameter, which determines how many ladder rungs there should be between each twist. The machine may suitably twist the needle on the first slat. The twist is suitably done after the machine has laced the slat and before the laced slat is lifted. When the lacing of a completed production of slats to the ladder cord is finished, a lift cord (not shown) is inserted in the eye 219, see FIG. 3*b*, of the needle 211. The needle 211, which is attached to the stack of slats, with the lift cord attached is then drawn through the ladder cords twisted about the needle.

The inner side of one of the side members 215 of a ladder cord guiding unit 214, is shown in FIG. 5*a*. Each side member 215 of the ladder cord guiding unit may contain a slot 232 in which the ladder cord is guided, the ladder cord is introduced from below, at entrance 230, in the slotted channel 232 and leaves the ladder cord guiding unit at the upper end 231. A detent 233 is arranged in the path of the rungs, 236 and 237, of the ladder cord guided in the slot 232. Rungs 236, 237 would correspond to the rungs 222 illustrated in FIGS. 4*a*–4*d*.

An enlarged view of a partial detail of the side member 215 of a ladder cord guiding unit 214 is illustrated in FIG. 5*b*. According to an embodiment of the present invention, the slot is curved at 234 and includes a lip formed at 235, adapted to engage behind the ladder rung 237 so as to retain this rung 237 in one feeding position, and serving as a support for the ladder cord. As evident from FIG. 3*a*, the ladder cord and a slat which has been laced, is lifted to a position F. However, the ladder cord can be lifted too high and the gap between the rungs of the ladder cord will not be in position for receiving a slat. The detent 233 is arranged in the way of a rung upstream from (i.e., lower positioned than) the rung 237 behind the lip 235. When the detent 233 pushes downward on this lower positioned rung and thereby pull the ladder cord backwards slightly, that positions or seats the rung 237 behind the lip 235. This is of importance in order to obtain an exact placement of slats relative to the rungs of the ladder cord (position E in FIG. 3*a*).

A modified form of a slat guiding unit 240 may be arranged close to, immediately upstream and/or downstream of, the ladder cord guiding unit 214 in the slat feed direction. The modified slat guiding unit 240 having slat supporting wheels 241 according to an embodiment of the present invention, is shown in FIG. 6. The slat supporting wheels 241 keep the slats on the track 244 for feeding slats forward. A shaft 242 of each slat supporting wheel 241 is rotatably supported in a bracket 245, which in turn is pivotally arranged around a respective axis 243. As shown in FIG. 6, the slat supporting wheels 241 are in the position for supporting a slat. After the needle 211 has made a twist round the ladder cord 76, the slat supporting wheels 241 are pivoted upwards about axes 243 and thus released in opened position whereafter the slat is lifted. Of course, the axes 243 of the slat supporting wheel 241 can also be horizontally movable along the plane of the track 244.

The expressions throughout the present description of "front" and "back", "upstream" and "downstream" respective, are in reference to the slat feed direction.

We claim:

1. A lacing station for lacing a slat into a ladder cord during assembly of a Venetian blind wherein the ladder cord includes coextensive side cords and rungs therein between, the lacing station including:

a slat guiding unit defining a feed path for the slat;

a ladder cord guiding unit mounted adjacent the slat guiding unit and in the feed path for guiding and positioning the ladder cord in exact position for receiving a slat in the slat feed path; and at least one needle to one lateral side of the slat feed path, the at least one needle having a vertically arranged elongated shaft, an upper end and a lower end, the elongated shaft being rotatably mounted, the needle including a tip on the lower end in close proximity to the ladder cord guiding unit, the tip of the needle is arranged perpendicular to the elongated shaft and is adapted to be in close contact with the side cord of the ladder cord for engagement with one of the side cords of the ladder for twisting the side cord around the needle.

2. The lacing station according to claim 1, wherein the upper end of the at least one needle is connected to an overhead positioned needle supporting arm having a driving mechanism for pivoting the at least one needle.

3. The lacing station according to claim 2, wherein the upper end of the at least one needle is connected to a gearwheel in the needle supporting arm, wherein the gearwheel is in engagement with a gear rack.

4. The lacing station according to any one of claims 1–3, wherein the at least one needle is arranged to be pivoted through an angular range from about 300 degrees up to about 360 degrees.

5. The lacing station according to any one of claims 1–3, wherein the at least one needle is arranged to be pivoted through an angular range from about 310 degrees up to about 350 degrees.

6. The lacing station according to claim 1, wherein the at least one needle comprises a pair of needles, one on each lateral side of the slat feed path.

7. The lacing station according to claim 1 or 6, wherein the tip of the needle is T-shaped.

8. The lacing station according to claim 6, wherein said upper end of each needle of said pair of needles is connected to an overhead positioned needle supporting arm having a driving mechanism for pivoting said pair of needles.

9. The lacing station according to claim 8, wherein said driving mechanism comprises a pair of gearwheels, one gearwheel affixed to the upper end of each of said pair of needles, wherein said gearwheels are rotatably mounted in said needle supporting arm;

a gear rack drivingly engaged with said pair of gearwheels and slidingly mounted in said needle supporting arm.

10. The lacing station according to claim 9, wherein each needle of the pair of needles is arranged to be pivoted through an angular range from about 300 degrees up to about 360 degrees.

11. The lacing station according to claim 9, wherein the tip of each needle of the pair of needles is T-shaped and arranged substantially perpendicularly to said elongated shaft.

12. The lacing station according to claim 9, wherein said ladder cord guiding unit comprises a pair of side members each on opposite lateral side of the slat feed path and wherein each of said side members comprises a curved slot including a formed lip adapted to engage behind an engaged ladder rung of the ladder cord so as to retain the engaged ladder rung in one feeding position.

13. The lacing station according to claim 1, wherein a side member of the ladder cord guiding unit on at least one lateral side of the slat feed path comprises a curved slot including a formed lip adapted to engage behind an engaged ladder rung of the ladder cord so as to retain the engaged ladder rung in a receiving position.

14. The lacing station according to claim 13, wherein the slat guiding unit is arranged immediately upstream of the ladder cord guiding unit.

15. The lacing station according to claim 6, 13, or 14, wherein the slat guiding unit includes supporting wheels serving as support for the slat when fed in position for lacing.

16. The lacing station according to claim 1, wherein the slat guiding unit includes supporting wheels serving as support for the slat when fed in position for lacing.

17. The lacing station according to claim 6 or 16, wherein the slat guiding unit is arranged immediately upstream of the ladder cord guiding unit.

18. A Venetian blind assembly machine including a plurality of lacing stations according to claim 1.

19. The Venetian blind assembly machine according to claim 18, wherein every second needle along one lateral side of the slat feed path is adopted to simultaneously move in a first direction.

20. A lacing station (210) for a Venetian blind assembly machine, said lacing station comprising a slat guiding unit (240) and a ladder cord guiding unit (214) for guiding a ladder cord in exact position for receiving a slat, wherein at least one needle (211) is vertically arranged above the ladder cord guiding unit (214), a lower end of the needle (211) being moveably arranged to be in close contact with the ladder cord for engagement with side cords of said ladder cord and having a tip (213) in close proximity to an upper end (231) of the ladder cord guiding unit (214) for twisting said ladder cord, wherein the tip of the needle is T-shaped (217), and wherein each side member (215) of the ladder cord guiding unit comprises a curved slot (234) including a formed lip (235) adapted to engage behind a ladder rung (237) so as to retain this in one feeding position.

21. A lacing station (210) for a Venetian blind assembly machine, said lacing station comprising a slat guiding unit (240) and a ladder cord guiding unit (214) for guiding a ladder cord in exact position for receiving a slat, wherein at least one needle (211) is vertically arranged above the ladder cord guiding unit (214), a lower end of the needle (211) being moveably arranged to be in close contact with the ladder cord for engagement with side cords of said ladder cord and having a tip (213) in close proximity to an upper end (231) of the ladder cord guiding unit (214) for twisting said ladder cord, wherein each side member (215) of the ladder cord guiding unit comprises a curved slot (234) including a formed lip (235) adapted to engage behind a ladder rung (237) so as to retain this in one feeding position.

22. The lacing station according to claim 21, wherein the slat guiding unit (240) is arranged immediately before the ladder cord guiding unit, and includes slat supporting wheels (241) serving as a support for the slats.

23. The lacing station according to claim 21, wherein the slat guiding unit (240) is arranged immediately after the ladder cord guiding unit, and includes slat supporting wheels (241) serving as a support for the slats.

24. A lacing station (210) for a Venetian blind assembly machine, said lacing station comprising a slat guiding unit (240) for guiding a slat along a slat feed path, and a ladder cord guiding unit (214) for guiding a ladder cord in exact position for receiving the slat, wherein at least one needle (211) is vertically arranged above the ladder cord guiding unit (214), a lower end of the needle (211) being moveably arranged to be in close contact with the ladder cord for engagement with side cords of said ladder cord and having a tip (213) in close proximity to an upper end (231) of the ladder cord guiding unit (214) for twisting said ladder cord, wherein the slat guiding unit (240) is arranged immediately before the ladder cord guiding unit, and includes slat supporting wheels (241) serving as a support for the slats.

25. A Venetian blind assembly machine including a plurality of lacing stations according to claim 24.

26. The Venetian blind assembly machine according to claim 25, wherein every second needle along one side of the slat feed path is adopted to simultaneously move in the same direction.

27. A lacing station (210) for a Venetian blind assembly machine, said lacing station comprising a slat guiding unit (240) for guiding a slat along a slat feed path, and a ladder cord guiding unit (214) for guiding a ladder cord in exact position for receiving the slat, wherein at least one needle (211) is vertically arranged above the ladder cord guiding unit (214), a lower end of the needle (211) being moveably arranged to be in close contact with the ladder cord for engagement with side cords of said ladder cord and having a tip (213) in close proximity to an upper end (231) of the ladder cord guiding unit (214) for twisting said ladder cord, wherein the slat guiding unit (240) is arranged immediately after the ladder cord guiding unit, and includes slat supporting wheels (241) serving as a support for the slats.

28. The lacing station according to any one of claims 22, 23, and 20–27, wherein an upper end of the needle is connected to an overhead positioned needle supporting arm (200) having a driving mechanism for pivoting the needle.

29. The lacing station according to claim 28, wherein the upper end of the needle (211) is connected in the needle supporting arm (200) to a gearwheel (201), which is in engagement with a gear rack (202).

30. Venetian blind assembly machine including a plurality of lacing stations according to claim 27.

31. The Venetian blind assembly machine according to claim 30, wherein every second needle along one side of the slat feed path is adopted to simultaneously move in the same direction.

32. The Venetian blind assembly machine according to any one of claims 25, 26, 30, and 31, wherein for each of said plurality of lacing stations an upper end of the needle is connected to an overhead positioned needle supporting arm (200) having a driving mechanism for pivoting the needle.

33. A Venetian blind assembly machine including a plurality of lacing stations, each said lacing station comprising a slat guiding unit (240) for guiding a slat along a slat feed path, and a ladder cord guiding unit (214) for guiding a ladder cord in exact position for receiving the slat, wherein at least one needle (211) is vertically arranged above the ladder cord guiding unit (214), a lower end of the needle (211) being moveably arranged to be in close contact with the ladder cord for engagement with side cords of said ladder cord and having a tip (213) in close proximity to an upper end (231) of the ladder cord guiding unit (214) for twisting said ladder cord, wherein every second needle along one side of the slat feed path is adopted to simultaneously move in a first direction.

34. The Venetian blind assembly machine according to claim 33, wherein for each said lacing station, an upper end of the needle is connected to an overhead positioned needle supporting arm (200) having a driving mechanism for pivoting the needle.

35. The Venetian blind assembly machine according to claim 34, wherein for each said lacing station, the upper end of the needle (211) is connected in the needle supporting arm (200) to a gearwheel (201), which is in engagement with a gear rack (202).

36. A lacing station for lacing a slat into a ladder cord during assembly of a Venetian blind, wherein said ladder cord includes side cords and rungs, said lacing station comprising a slat guiding unit defining a feed path for said slat;

a ladder cord guiding unit mounted adjacent said slat guiding unit and in said feed path, wherein said ladder cord guiding unit has an upper end;

a pair of needles, each needle including a lower end having a tip for engagement with at least one of said side cords of said ladder cord for twisting said ladder cord, each needle also having an elongated shaft vertically arranged and rotatably mounted, one on each side of said feed path, above said ladder cord guiding unit with said tip in close proximity to said upper end of said ladder cord guiding unit and in close contact with said side cords of said ladder cord, wherein said slat guiding unit is arranged immediately before said ladder cord guiding unit, and includes slat supporting wheels.

37. A lacing station for lacing a slat into a ladder cord during assembly of a Venetian blind, wherein said ladder cord includes side cords and rungs, said lacing station comprising a slat guiding unit defining a feed path for said slat;

a ladder cord guiding unit mounted adjacent said slat guiding unit and in said feed path, wherein said ladder cord guiding unit has an upper end;

a pair of needles, each needle including a lower end having a tip for engagement with at least one of said side cords of said ladder cord for twisting said ladder cord, each needle also having an elongated shaft vertically arranged and rotatably mounted, one on each side of said feed path, above said ladder cord guiding unit with said tip in close proximity to said upper end of said ladder cord guiding unit and in close contact with said side cords of said ladder cord;

wherein each of said elongated shafts has an upper end connected to an overhead positioned needle supporting arm having a driving mechanism for pivoting said pair of needles;

wherein said driving mechanism comprises a pair of gearwheels, one gearwheel affixed to said upper end of each of said elongated shafts, wherein said gearwheels are rotatably mounted in said needle supporting arm;

a gear rack drivingly engaged with said pair of gearwheels and slidingly mounted is said needle supporting arm; and wherein said ladder cord guiding unit comprises a pair of side members, and wherein each of said side members comprises a curved slot including a formed lip adapted to engage behind one of said rungs.

* * * * *